United States Patent
Plate et al.

(10) Patent No.: US 7,490,801 B2
(45) Date of Patent: *Feb. 17, 2009

(54) SUSPENSION CLAMPING HOLDER FOR A SUPPORT STRUCTURE

(75) Inventors: Hans-Georg Plate, Roseburg (DE); Lutz Schapke, Hamburg (DE); Doris Zyrull, Neu Wulmstorf (DE)

(73) Assignee: Airbus Deutschland GmbH, Hamburg (DE)

( * ) Notice: Subject to any disclaimer, the term of this patent is extended or adjusted under 35 U.S.C. 154(b) by 233 days.

This patent is subject to a terminal disclaimer.

(21) Appl. No.: 11/120,696

(22) Filed: May 2, 2005

(65) Prior Publication Data

US 2006/0016937 A1 Jan. 26, 2006

Related U.S. Application Data

(60) Provisional application No. 60/600,064, filed on Aug. 9, 2004.

(30) Foreign Application Priority Data

Apr. 30, 2004 (DE) ........................ 10 2004 021 513
Apr. 29, 2005 (EP) ................................. 05009493

(51) Int. Cl.
*A47B 96/06* (2006.01)
*E04G 3/00* (2006.01)
*F16B 1/00* (2006.01)
*G09F 7/18* (2006.01)

(52) U.S. Cl. .................. 248/228.1; 248/72; 248/231.9; 248/245; 248/317; 52/702

(58) Field of Classification Search ................. 248/72, 248/228.1, 231.9, 245, 317; 52/506.07, 702, 52/647
See application file for complete search history.

(56) References Cited

U.S. PATENT DOCUMENTS

| 1,322,869 | A | * | 11/1919 | Benedict | ........................ 182/92 |
| 1,662,539 | A | | 3/1928 | Schmidt | |
| 1,830,438 | A | * | 11/1931 | Miller | .......................... 248/73 |
| 2,615,666 | A | | 10/1952 | Jones | |
| 2,678,786 | A | | 8/1954 | Kindorf | |
| 3,445,081 | A | | 5/1969 | Roussos | |

(Continued)

FOREIGN PATENT DOCUMENTS

DE 197 43 976 A1 5/1998

(Continued)

*Primary Examiner*—J. Allen Shriver, II
*Assistant Examiner*—Michael McDuffie
(74) *Attorney, Agent, or Firm*—Christopher Paradies; Fowler White Boggs P.A.

(57) ABSTRACT

A suspension clamping holder is designed for use with a supporting structure. The supporting structure may have a first region and a another region extending from the first region at an angle. The first region has a holding portion, which is used to support the weight of the holder any load carried by the holder. The holder is capable of being suspended from the supporting structure. A holding element on one end of the holder is suspended from the supporting structure and a clamping slider is connected releasably with the bar region of the supporting structure. The clamping slider is capable of being fixedly clamped onto the bar region and the holder is capable of being locked on the supporting structure without any necessary screws.

18 Claims, 3 Drawing Sheets

U.S. PATENT DOCUMENTS

| | | | |
|---|---|---|---|
| 3,954,247 A | 5/1976 | Krusche | |
| 4,013,253 A | 3/1977 | Perrault et al. | |
| 4,124,962 A | 11/1978 | Lancelot, III et al. | |
| 4,151,917 A | 5/1979 | Pugh | |
| 4,646,647 A | 3/1987 | Spoler et al. | |
| 4,665,672 A | 5/1987 | Commins et al. | |
| 4,739,602 A | 4/1988 | Fricker | |
| 4,744,191 A | 5/1988 | Fricker | |
| 4,759,654 A | 7/1988 | Martin et al. | |
| 4,802,786 A | 2/1989 | Yauger et al. | |
| 4,825,621 A | 5/1989 | Jensen | |
| 4,920,725 A | 5/1990 | Gore | |
| 5,092,546 A * | 3/1992 | Wolfbauer | 248/49 |
| 5,316,244 A | 5/1994 | Zetena, Jr. | |
| 5,549,049 A | 8/1996 | Deandrea | |
| 5,560,575 A * | 10/1996 | Krysiak | 248/222.12 |
| 5,788,192 A * | 8/1998 | Poole, Jr. | 248/49 |
| 5,797,573 A | 8/1998 | Nasu | |
| 5,823,484 A * | 10/1998 | Barnard et al. | 248/72 |
| 5,868,263 A * | 2/1999 | McAllister et al. | 211/90.01 |
| 5,941,485 A * | 8/1999 | Davidson et al. | 248/218.4 |
| 5,947,424 A * | 9/1999 | Heath | 248/58 |
| 6,086,032 A | 7/2000 | van Leeuwen | |
| 6,378,822 B1 | 4/2002 | Franks | |
| 6,412,733 B1 * | 7/2002 | Grzemski | 248/49 |
| 6,484,982 B1 | 11/2002 | Barry et al. | |
| 6,491,272 B1 * | 12/2002 | Franks | 248/218.4 |
| 6,557,807 B1 * | 5/2003 | Belanger | 248/215 |
| 6,565,048 B1 * | 5/2003 | Meyer | 248/58 |
| 6,631,874 B2 * | 10/2003 | Turpin et al. | 248/49 |
| 7,210,657 B2 * | 5/2007 | Plate et al. | 248/72 |

FOREIGN PATENT DOCUMENTS

| | | |
|---|---|---|
| GB | 2 276 912 A | 10/1994 |

* cited by examiner

SUSPENSION CLAMPING HOLDER FOR A SUPPORT STRUCTURE

CROSS-RELATED APPLICATIONS

This application claims priority to German application DE 102004021 531.8, filed Apr. 30, 2004; U.S. Provisional Application 60/600,064, filed Aug. 9, 2004; European application 05 009 493.7, filed Apr. 29, 2005, which are incorporated by reference herein. This application is a co-pending application to U.S. patent application Ser. No. 11/118,694, filed Apr. 29, 2005, which is incorporated by reference herein.

FIELD OF THE INVENTION

The present invention relates to a suspension clamping holder for a support structure, to a closure element and to a fastening system.

TECHNICAL BACKGROUND

Clamping holders are known. For weight reduction in the aviation industry, these can be made from plastic. Such holders, however, have the disadvantage that they slip with time, since the plastic stretches or deforms by creep after extended use.

In the aviation industry, holders are mostly used, which are attached on a corresponding support structure via specially applied bores in these structures. Based on statistical reasons, the separately applied bores must be thickened in a plane-like manner, which in turn leads to an undesired weight increase. A further disadvantage is that the manufacturing expense is very high from the subsequently applied bores and, if necessary, required cleaning and deburring.

The document DE 197 43 976 A1 describes, for example, a holding device, which is to be mounted on a wall. The holding device has a profile piece, which has on its side turned toward the wall at least one horizontally projecting flange-like leg, which serves for suspension in a wall recess or in an associated intermediate piece. However, it is problematic to ensure rotational or twist security, whereby the wall must be provided with additional bores, or additional contact surfaces are necessary. Likewise, a corresponding screw connection can be used, which, however, in turn brings the previously noted disadvantages, since, in practice, an additional bore is required for the screw.

SUMMARY OF THE INVENTION

There is a need for a suspension clamping holder which can be mounted in a stable manner such that the holder does not slip over time.

According to one example, a suspension clamping holder is provided for a support structure. The support structure has a first region, provided with at least one holding member and at least one bar region. The first region and the bar region form an angle. The suspension clamping holder may comprise a holder having a holding element formed on one end, which is capable of being suspended on the holding member, and a clamping slider, capable of releasably gripping the bar region of the support structure. The clamping slider is capable of fixedly coupling onto the bar region of the support structure, locking the suspension clamping holder on to the holding member.

For example, the suspension clamping holder may be employed with T-shaped crossbeam profiles, like those that are used in aircraft pressure fuselages or for seat rail supports or support rail bearings. These support structures may be made from aluminum or fiber-reinforced composite material and may be provided, for weight savings, with facilitation bores, in which the preferably hook-shaped holding element of the suspension clamping holder may be suspended. According to an exemplary embodiment of the invention, no additional bores for secure attachment of the suspension clamping holder are necessary in addition to the facilitation bores already arranged in the support structure. Of course, the holding member provided in the support structure for suspending the hook-shaped holding element can be formed not only as bores, but also, for example, as projection with a corresponding groove, or they can be formed in another known manner.

The suspension clamping holder of the present invention may be used in particular with aircraft fuselage cross beams, seat rail supports, or sustain rail supports, in order to provide a suitable holder for, for example, cable bundles.

According to an exemplary embodiment of the invention, a suspension clamping holder is provided which can be mounted in a stable manner and which may be protected against torsion on a support structure, without requiring a modification of the support structure. The suspension clamping holder may be simple to handle and may have a minimal weight.

In particular, it may be possible that in the suspended state of the suspension clamping holder, by means of the cooperation of the contact surface of the hooked-in holding element and of the clamping slider clamped onto the bar region of the support structure, a secure attachment is enabled. By means of the additional locking via the clamping slider, a tilting, twisting, or sliding of the suspension clamping holder hanging on the holding member under the force of gravity may be effectively prevented.

Beyond this, it may be appropriate that the holder has a support, on which the clamping slider is arranged. For additional support of the suspended suspension clamping holder, the support may be adapted at least partially to the shape of the support structure, that is to its shape in the first region and/or in the bar region. Therefore, the support may rest, in the suspended state of the suspension clamping holder, at least partially between the holding member and the bar region on the first region of the support structure. If necessary, an additional support may take place by contact of the support on the bar region of the support structure. Furthermore, the suspension clamping holder can be adapted by means of different designs of the support in a simple manner to different support structure shapes.

According to an exemplary embodiment, the clamping slider may have two movable flanges, which surround the edge of the bar region in a clamping manner. The clamping slider may thereby be lockingly guided into the support. In addition, the clamping slider may be exchangeable, such that a thicker or larger clamping slider adapts to the height of the holding member or the thickness of the bar region is possible.

According to an alternative exemplary embodiment, the flanges of the clamping slider may be formed in such a manner that they enclose the edge of the bar region in a U-shape, wherein the clamping slider may be attached by suspension on the bar region. Also this clamping slider may be lockingly guided into the support and may be exchangeable. For weight savings, the clamping slider, however, also can be formed as one-piece with the support.

The holder can be provided with depressions for receiving cable bundles, for example. These depressions may be formed as arches in the holder such that the arches secure the cable bundles.

In one example, a particularly secure coupling of the suspension clamping holder uses a closure element. The closure element slides onto the suspended holding element and is subsequently locked by a suitable locking member.

Next, some examples of the invention will be described in greater detail with reference to embodiments illustrated by the drawings. In the drawings:

FIG. 1b shows a sectional view of the assembly shown in FIG. 1a;

FIG. 2a shows a three-dimensional representation of a second exemplary embodiment of the suspension clamping holder according to the present invention, which is suspended in a crossbeam with a double T-profile;

FIG. 2b shows a sectional view of the assembly shown in FIG. 2a;

DETAILED DESCRIPTION OF EXEMPLARY EMBODIMENTS

Figure 1B:
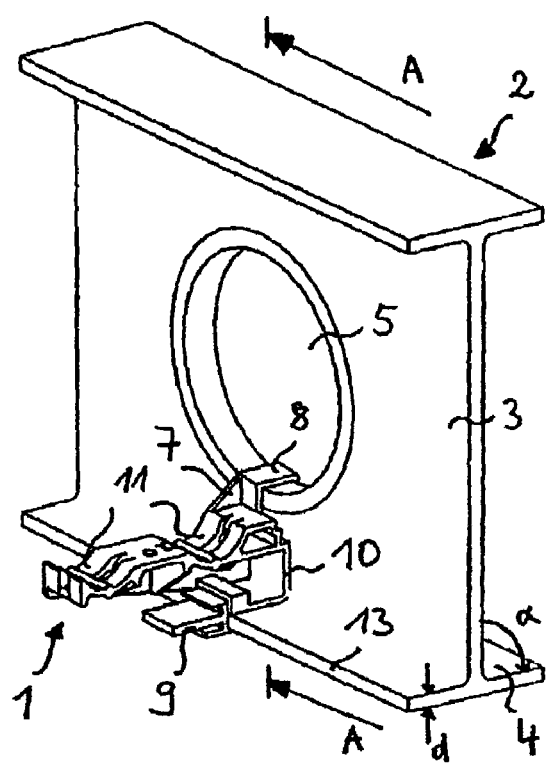
Figure 1A:
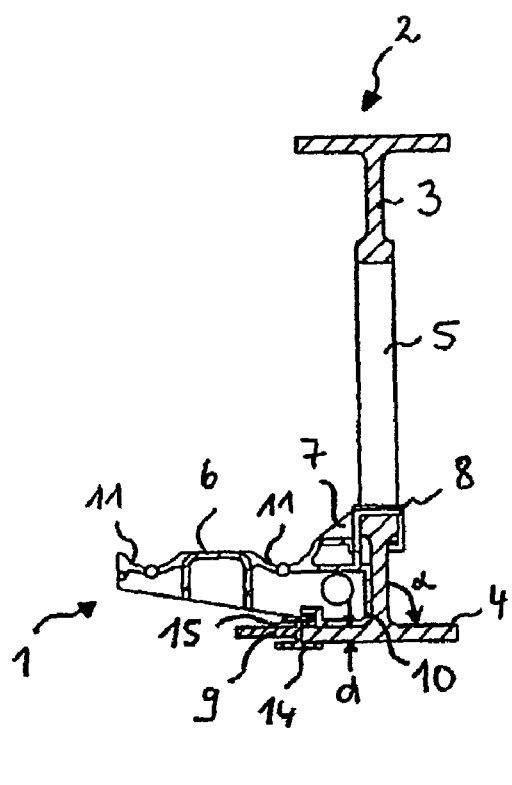
FIG. 1a shows a three-dimensional representation of a first exemplary embodiment of the suspension clamping holder according to the present invention, which is suspended in a crossbeam with a doubled T-profile.

FIG. 1a shows in three-dimensional representation a suspension clamping holder 1, which is suspended in a crossbeam 2 with a double T-profile. FIG. 1b shows a sectional view of FIG. 1a along the line A-A. The crossbeam 2 has a first region 3, which is provided on both sides with T-profiles arranged at a right angle ($\alpha \approx 90°$) thereto, which are designated subsequently as bar regions 4. Such a crossbeam is typically used in aircraft construction for fuselage structures, seat rail supports, or support rail bearings. For weight savings, the crossbeam 2 is provided with so-called facilitation bores 5, which are arranged in the first region 3 of the crossbeam 2.

The suspension clamping holder 1 has a holder 6, on an end 7 of which, a hook-shaped holding element 8 is formed. Via the holding element 8, the suspension clamping holder 1 is suspended in the bore 5 of the crossbeam 2. In this manner, the suspension clamping holder 1 is supported via the contact surface of the holding element 8 suspended in the bore 5. For additional support of the suspended suspension clamping holder 1, a support 10 is provided on the holder 6. The support 10 is adapted to the shape of the crossbeam 2 in such a manner that, in the suspended state, the support 10 rests on the first region 3 of the crossbeam 2, as well as on the angled bar region 4 of the crossbeam 2.

In order to prevent a release of the suspended suspension clamping holder 1 by slipping, twisting, or tilting, the suspension clamping holder 1 has a clamping slider 9, which is lockably guided in the support 10 and releasably connected with the bar region 4. For locking of the suspension clamping holder 1 suspended in the bore 5, the clamping slider 9 is fixedly clamped onto the bar region 4. In this connection, the flanges 14, 15 of the clamping slider 9 clampingly surround the bar region 4 (see FIG. 1a). By means of the pressure load of the section of the flanges 14, 15 projecting over the bar region 4, the clamping slider 9 can again be released when necessary. The clamping effect of the clamping slider 9, therefore, is designed such that a secure locking is possible even with different bar thicknesses d.

For receiving of cable bundles, the holder 6 is further provided with depressions or dents 11, which are formed in the embodiment of FIGS. 1a and 1b in the shape of an arc.

Figures 2A, 2B:
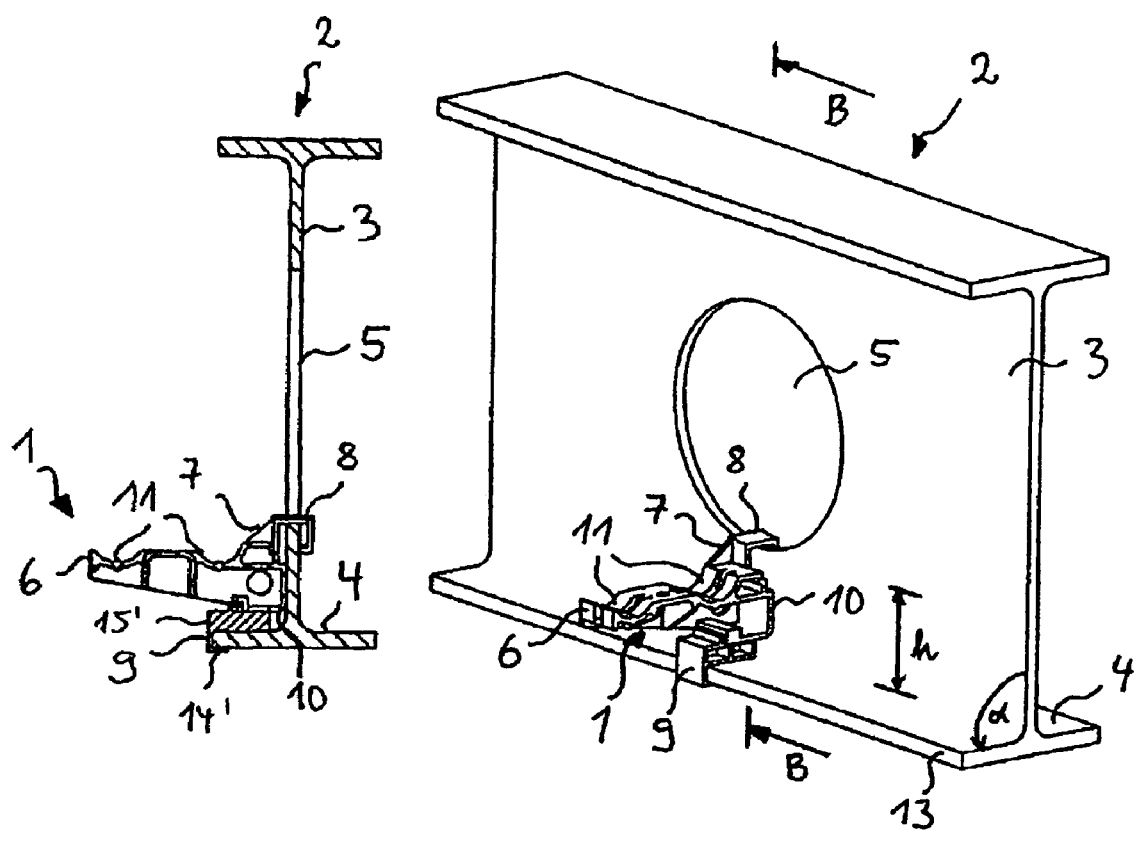

FIG. 2a shows in a three-dimension view an embodiment of the suspension clamping device 1 of the present invention with a modified clamping slider 9. In FIG. 2b, a sectional view of FIG. 2a along line B-B is shown. The components already described in connection with FIGS. 1a and 1b are designated subsequently with identical reference numerals. The suspension clamping holder 1 is again suspended via its hook-shaped holding element 8 in the facilitation bore 5 of the crossbeam 2. In contrast to the embodiment of FIGS. 1a and 1b, the flanges 14', 15' of the clamping slider 9 surround the bar region in a U-shape. In this manner, the flange 15' facing in the direction of the holder 6, for example, can be thicker than with the embodiment according to FIGS. 1a and 1b, whereby the suspension clamping holder 1 can be adapted to the height h of the bore 5. Thus, upon exchanging the clamping slider 9, a simple adaptation to different bore heights is possible. With use of a thicker clamping slider 9, as shown in FIGS. 2a and 2b, in the suspended state of the suspended clamping holder 1, only the part of the support 10 running parallel to the first region 3 rests on the crossbeam 2. The part of the support 10 running parallel to the bar region 4 is spaced from the bar region 4 by means of the flange 15' facing in the direction of the holder 6.

In FIG. 1a to FIG. 2b the clamping slider 9 may be pushed on the bar region 4 (bottom flange) of the double-T-shaped crossbeam (carrier) 2 engaging the crossbeam 2 using engaging element 14. Also, the hook-like holding element 8 encloses a rim of the bore 5 of the T-shaped carrier 2.

Figure 3:
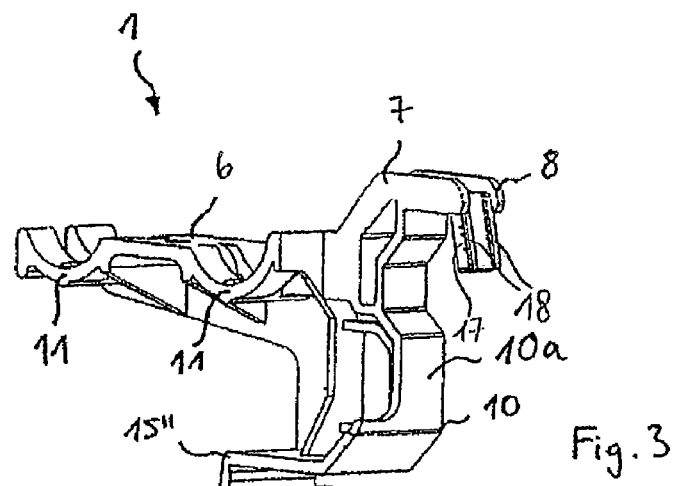
FIG. 3 shows a third exemplary embodiment of the suspension clamping holder according to the present invention in three-dimensional representation.

FIG. 3 illustrates a three-dimensional representation of an example of the suspension clamping holder 1 of the present invention with an integrally formed clamping slider 9. The suspension clamping holder 1 has a holder 6, which is provided with depressions 11. On one end 7 of the holder 1, a holding element 8 as well as a support 10 are formed. The clamping slider 9 is formed integrally as one piece on the support 10, such that the upper flange 15" of the clamping slider 9 simultaneously assumes the support function of the region of the support 10 running parallel to the bar region 4, as shown in FIG. 5, for example.

Figure 5:
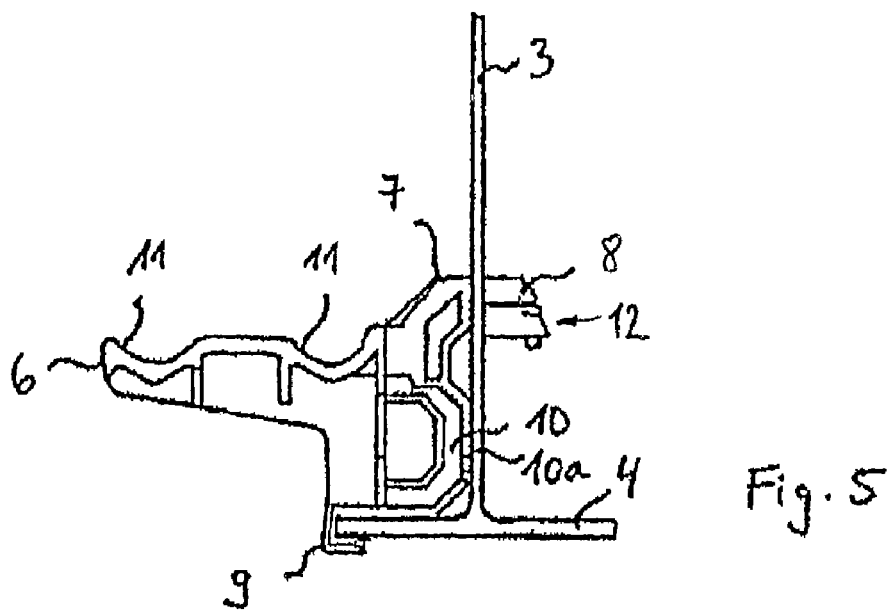
FIG. 5 shows a sectional view of the suspended suspension clamping holder according to FIG. 3, which is locked with a closure element according to FIG. 4.

To this purpose, the support 10 is formed, in the example of FIG. 3 and as shown in FIG. 5, in the region running parallel to the first region 3 of the support structure 2 angled in such a manner that the support 10 in the suspended state of the suspension clamping holder 1 merely rests via the region 10a of the support on the first region 3 of the crossbeam 2. By means of a specialized design of the support 10, therefore, the suspension clamping holder 1 can be adapted to the shape of the crossbeam 2.

Figure 4:
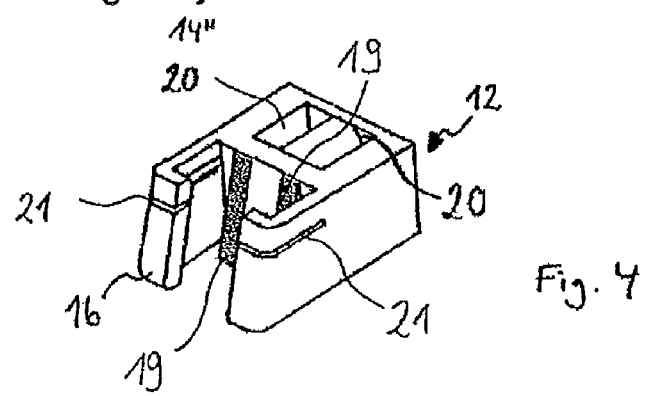
FIG. 4 shows a three-dimensional representation of a closing element for the suspension clamping holder according to FIG. 3.

FIG. 4 shows a three-dimensional representation of a closure element 12. The closure element 12 is capable of securing the suspended suspension clamping holder 1 to the crossbeam 2. The closure element 12 of FIG. 4 has a slot-shaped nose region 16, via which the closure element 12 slides on the suspended holding element 8, as shown in FIG. 5. The closure element 12 may be operatively locked using a locking mechanism.

FIG. 5 shows in sectional view the suspension clamping holder 1 according to FIG. 3 in a suspended state, wherein the holding element 8 is locked by the suspended closure element 12.

The example illustrated in FIGS. 3-5 comprises two parts: the suspension clamping holder 1 depicted in FIG. 3 and the closure element 12 depicted in FIG. 4. The closure element 12 may be a press fit element, which couples to the suspension clamping holder 1 in the manner shown in FIG. 5.

Next, the process of fastening the suspension clamping holder and holding element 8 to the crossbeam 2 is described. The suspension clamping holder 1 with the holding element 8 inclined about 15° to the crossbeam 2 and is suspended in the bore 5 of the double-T-shaped crossbeam 2. After that, the suspension clamping holder 1 with the clamping slider 9 slides over the horizontal part 4 of the double-T-shaped crossbeam 2 such that the region 10a of the support of the suspension clamping holder 1 abuts the vertical surface 3 of the double-T-shaped crossbeam 2.

This prevents a tilting or dumping (that is to say an undesired removal) of the suspension clamping holder 1, which may be caused by applying a weight to the depressions or dents 11, then, press fit closure element 12 is slides onto the holding element 8 of the suspension clamping holder 1. In one example, the holding element 8 is inclined 15° to the first region 3 of the crossbeam 2. From the lowest position of the press-on closure element 12 at the holding element 8 inclined by 15°to the highest position of the press-on closure element 12, application of the press fit closure element 12 is capable of compensating for any thickness difference of the first region 3 of the double-T-shaped crossbeam 2. For example, roughened surfaces 19 may be inclined at the same angle as the roughened surfaces 18 of holding element 8, as shown in FIGS. 3-4.

In order to prevent that the press-on closure element 12 drops away or falls off the holding element 8 or is released by a vibration, rest surfaces 17 may have rest knobs (not shown) disposed laterally along the holding element 8. Rest knobs are raised ribs or knobs that are capable of locking or engaging with rest slits 21 of the press fit closure element 12. The hooks of the slot-shaped nose region 16 of the press fit closure element 12 grip the holding element 8 of the suspension clamping holder 1.

In one example, the press fit closure element 12 is provided with two roughened surfaces 19 abutting against a roughened surface 18 of the holding element 8 of the suspension clamping holder 1. The roughened surfaces 18, 19 may allow locking and unlocking of the press fit closure element 12 or may ratchet, allowing the press fit element closure 12 to engage the holding element 8, but preventing disengagement without prying the press fit closure element 12 from the holding element 8 by force.

For the sake of security and in order to ensure a proper mounting of the press-on element closure 12, a cable binder is finally guided through two slits (not shown) in the end 7 of the suspension clamping holder land through two slits 20 of the press-on closure element 12 and are tightened. Consequently, the vertical part 3 of the double-T-shaped crossbeam 2 is chocked or securely fastened between the suspension clamping holder 1 and the press-on closure element 12.

In one example, the end 7 and the holding element 8 have only half the width of the (broadest part of the) suspension clamping holder 1 as shown in FIG. 3. This allows another clamping holder 1 to be mounted on the opposite side of the crossbeam 2 opposite of the first suspension clamping holder 1. This feature has the advantage of saving space. Also, suspension clamping holders 1 of the same type may be mounted on both sides of first region 3, so long as the crossbeam 2 is T-shaped. If the crossbeam 12 is L-shaped, then the suspension clamping holder 1 may be mounted on the side having the extension extending from the first region 3 of the crossbeam 2.

Of course, in one facilitation bore 5 of a crossbeam 2, also two suspension clamping holders 1 can be suspended on both sides, which is not shown, however.

The suspension clamping holder 1 is prevented from shifting, slipping, twisting, and loosening by locking the suspension clamping holder 1 to the bore 5 through a crossbeam 2, for example. This has the advantage of providing a system that is easily installed and adjusted, while reducing weight compared to competing systems.

What is claimed is:

1. Suspension clamping holder for a support structure, the support structure having a first region and a bar region forming an angle with the first region, the first region having a holding portion, the suspension clamping holder comprising:
    a hanger having a holding element on one end, the holding element and the hanger being capable of suspending the suspension clamping holder from the support structure;
    a clamping slider joined with the hanger, such that the clamping slider is capable of being coupled releasably with the bar region such that the suspension clamping holder is capable of being clamped fixedly onto the bar region for locking the suspension clamping holder against the holding portion of the first region of the support structure; and
    a closure element, the closure element locking the holding element to the holding portion of the first region of the support structure.

2. Suspension clamping holder of claim 1, wherein the holding portion is a bore through the first region and the holding element has a hook-like configuration for suspension on the holding portion of the first region.

3. Suspension clamping holder of claim 1, wherein the suspension clamping holder has a support on which the clamping slider is disposed.

4. Suspension clamping holder of claim 3, wherein the support is adapted at least partially to the shape of the support structure in the first region and/or in the bar region such that the support rests against one of a surface of the first region, a surface of the bar region, or surfaces of both the first region and the bar region of the support structure.

5. Suspension clamping holder of claim 1, wherein the clamping slider has flanges which surround the edge of the bar region in a U-shape.

6. Suspension clamping holder of claim 1, wherein the clamping slider is lockingly guided between the holding element and the bar region.

7. Suspension clamping holder of claim 5, wherein the clamping slider is integrally formed on the support.

8. Suspension clamping holder of claim 1, wherein a holder extending from the hanger is provided with at least one indentation in a surface of a distal portion of the holder extending from the hanger and the at least one indentation is disposed distally from the holding element.

9. Suspension clamping holder of claim 1, wherein the closure element is capable of being slid onto the holding element as the holding element is suspended from the holding portion of the support structure.

10. Suspension clamping holder of claim 1 for suspension in crossbeams provided with bores for aircraft fuselage structures, seat rail supports, or support rail bearings having a structure capable of being mounted on either or both sides of the bores.

11. Suspension clamping holder of claim 1 for suspension in T-profiles provided with bores made from aluminum or fiber-reinforced composite having a structure capable of being mounted on either or both sides of the bores.

12. Suspension clamping holder of claim 11, wherein the holding element has a width and the width is one-half of a broadest portion of the suspension clamping holder.

13. A closure element for fastening a suspension clamping holder of claim 1, the closure element comprising:
    at least one hook adapted to grip the holding element extending from a free end of the hanger at one end of the suspension clamping holder; and a slit provided in the at least one hook, such that the slit engages protrusions provided on at least one surface of the holding element.

14. The closure element of claim 13, wherein the closure element is configured to lock the suspension clamping holder on the holding portion of the support structure.

15. The closure element of claim 13, further comprising a roughened surface configured to engage a roughened surface of the holding element of the suspension clamping holder.

16. The closure element of claim 13, further comprising at least one of a slit or a hole configured to receive a cable binder.

17. A fastening system for a support structure having a first region and a bar region forming an angle with the first region, the first region having a holding portion, the fastening system comprising:

a suspension clamping holder comprised of:

a hanger having a holding element on one end, the holding element and the hanger being capable of suspending the suspension clamping holder from the support structure; and a clamping slider joined with the hanger, such that the clamping slider is capable of being coupled releasably with the bar region such that the suspension clamping holder is capable of being clamped fixedly onto the bar region for locking the suspension clamping holder against the holding portion of the first region of the support structure; and the fastening system further comprising; and a closure element, the closure element locking the holding element to the holding portion of the first region of the support structure.

18. The fastening system of claim 17, wherein the closure element of the fastening system comprises:

at least one hook adapted to grip the holding element extending from a free end of the hanger at one end of the suspension clamping holder; and a slit provided in the at least one hook, the slit being configured to engage a plurality of protrusions provided on at least one surface of the holding element.

* * * * *